US008539398B2

(12) United States Patent
McDonald et al.

(10) Patent No.: US 8,539,398 B2
(45) Date of Patent: *Sep. 17, 2013

(54) MODEL FOR A HARDWARE DEVICE-INDEPENDENT METHOD OF DEFINING EMBEDDED FIRMWARE FOR PROGRAMMABLE SYSTEMS

(75) Inventors: John McDonald, Woodinville, WA (US); Jon Pearson, Mukilteo, WA (US); Kenneth Ogami, Bothell, WA (US); Doug Anderson, Edmund, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/789,399

(22) Filed: May 27, 2010

(65) Prior Publication Data

US 2010/0275173 A1 Oct. 28, 2010

Related U.S. Application Data

(63) Continuation of application No. 11/201,922, filed on Aug. 10, 2005.

(60) Provisional application No. 60/601,263, filed on Aug. 13, 2004.

(51) Int. Cl.
*G06F 17/50* (2006.01)

(52) U.S. Cl.
USPC ........... 716/100; 716/101; 716/102; 716/116; 716/117; 716/138; 716/139

(58) Field of Classification Search
USPC .................. 716/138–139, 100–102, 116–117
See application file for complete search history.

(56) References Cited

U.S. PATENT DOCUMENTS

| | | | |
|---|---|---|---|
| 4,061,987 A | 12/1977 | Nagahama | |
| 4,134,073 A | 1/1979 | MacGregor | |
| 4,138,671 A | 2/1979 | Comer et al. | |
| 4,176,258 A | 11/1979 | Jackson | |
| 4,272,760 A | 6/1981 | Prazak et al. | |
| 4,344,067 A | 8/1982 | Lee | |
| 4,656,603 A | 4/1987 | Dunn | |
| 4,689,740 A | 8/1987 | Moelands et al. | |

(Continued)

FOREIGN PATENT DOCUMENTS

| | | |
|---|---|---|
| WO | 9532478 A1 | 11/1995 |
| WO | 9617305 A1 | 6/1996 |
| WO | 9834376 A1 | 8/1998 |
| WO | 9909712 A1 | 2/1999 |

OTHER PUBLICATIONS

U.S. Appl. No. 09/989,574: "Method and System for using a Graphics user Interface for Programming an Electronic Device," Bartz et al., filed on Nov. 19, 2001; 43 pages.

(Continued)

*Primary Examiner* — Stacy Whitmore (57) ABSTRACT

A processing device programming system automatically provides a user interface comprising a selectable list of one or more processing devices based on a system level solution, automatically generates an embedded programmable system solution from the system level solution and a processing device selected from the selectable list of one or more processing devices, and automatically programs the processing device according to the embedded programmable system solution.

19 Claims, 6 Drawing Sheets

(56) References Cited

U.S. PATENT DOCUMENTS

| | | |
|---|---|---|
| 4,692,718 A | 9/1987 | Roza et al. |
| 4,809,345 A | 2/1989 | Tabata et al. |
| 4,827,401 A | 5/1989 | Hrustich et al. |
| 4,868,525 A | 9/1989 | Dias |
| 4,937,743 A | 6/1990 | Rassman et al. |
| 4,947,169 A | 8/1990 | Smith et al. |
| 4,964,074 A | 10/1990 | Suzuki et al. |
| 5,050,168 A | 9/1991 | Paterson |
| 5,127,103 A | 6/1992 | Hill et al. |
| 5,128,871 A | 7/1992 | Schmitz |
| 5,140,197 A | 8/1992 | Grider |
| 5,150,079 A | 9/1992 | Williams et al. |
| 5,155,836 A | 10/1992 | Jordan et al. |
| 5,175,884 A | 12/1992 | Suarez |
| 5,179,531 A | 1/1993 | Yamaki |
| 5,200,751 A | 4/1993 | Smith |
| 5,202,687 A | 4/1993 | Distinti |
| 5,220,512 A | 6/1993 | Watkins et al. |
| 5,241,492 A | 8/1993 | Girardeau, Jr. |
| 5,258,760 A | 11/1993 | Moody et al. |
| 5,304,955 A | 4/1994 | Atriss et al. |
| 5,319,370 A | 6/1994 | Signore et al. |
| 5,321,828 A | 6/1994 | Phillips et al. |
| 5,325,512 A | 6/1994 | Takahashi |
| 5,331,571 A | 7/1994 | Aronoff et al. |
| 5,339,262 A | 8/1994 | Rostoker et al. |
| 5,345,195 A | 9/1994 | Cordoba et al. |
| 5,357,626 A | 10/1994 | Johnson et al. |
| 5,371,860 A | 12/1994 | Mura et al. |
| 5,394,522 A | 2/1995 | Sanchez-Frank et al. |
| 5,399,922 A | 3/1995 | Kiani et al. |
| 5,414,308 A | 5/1995 | Lee et al. |
| 5,416,895 A | 5/1995 | Anderson et al. |
| 5,422,833 A | 6/1995 | Kelem et al. |
| 5,426,378 A | 6/1995 | Ong |
| 5,428,319 A | 6/1995 | Marvin et al. |
| 5,430,687 A | 7/1995 | Hung et al. |
| 5,438,672 A | 8/1995 | Dey |
| 5,440,305 A | 8/1995 | Signore et al. |
| 5,455,927 A | 10/1995 | Huang |
| 5,479,643 A | 12/1995 | Bhaskar et al. |
| 5,493,723 A | 2/1996 | Beck et al. |
| 5,495,594 A | 2/1996 | MacKenna et al. |
| 5,499,192 A | 3/1996 | Knapp et al. |
| 5,519,854 A | 5/1996 | Watt |
| 5,544,067 A | 8/1996 | Rostoker et al. |
| 5,546,433 A | 8/1996 | Tran et al. |
| 5,546,562 A | 8/1996 | Patel |
| 5,552,748 A | 9/1996 | O'Shaughnessy |
| 5,557,762 A | 9/1996 | Okuaki et al. |
| 5,559,502 A | 9/1996 | Schutte |
| 5,559,996 A | 9/1996 | Fujioka |
| 5,563,526 A | 10/1996 | Hastings et al. |
| 5,564,108 A | 10/1996 | Hunsaker et al. |
| 5,572,665 A | 11/1996 | Nakabayashi |
| 5,574,892 A | 11/1996 | Christensen |
| 5,587,957 A | 12/1996 | Kowalczyk et al. |
| 5,590,354 A | 12/1996 | Klapproth et al. |
| 5,594,734 A | 1/1997 | Worsley et al. |
| 5,594,890 A | 1/1997 | Yamaura et al. |
| 5,600,262 A | 2/1997 | Kolze |
| 5,604,466 A | 2/1997 | Dreps et al. |
| 5,614,861 A | 3/1997 | Harada |
| 5,629,857 A | 5/1997 | Brennan |
| 5,630,052 A | 5/1997 | Shah |
| 5,630,102 A | 5/1997 | Johnson et al. |
| 5,633,766 A | 5/1997 | Hase et al. |
| 5,663,900 A | 9/1997 | Bhandari et al. |
| 5,670,915 A | 9/1997 | Cooper et al. |
| 5,673,198 A | 9/1997 | Lawman et al. |
| 5,675,825 A | 10/1997 | Dreyer et al. |
| 5,680,070 A | 10/1997 | Anderson et al. |
| 5,684,434 A | 11/1997 | Mann et al. |
| 5,689,196 A | 11/1997 | Schutte |
| 5,691,898 A | 11/1997 | Rosenberg et al. |
| 5,699,024 A | 12/1997 | Manlove et al. |
| 5,703,871 A | 12/1997 | Pope et al. |
| 5,706,453 A | 1/1998 | Cheng et al. |
| 5,708,798 A | 1/1998 | Lynch et al. |
| 5,710,906 A | 1/1998 | Ghosh et al. |
| 5,732,277 A | 3/1998 | Kodosky et al. |
| 5,737,557 A | 4/1998 | Sullivan |
| 5,745,011 A | 4/1998 | Scott |
| 5,748,875 A | 5/1998 | Tzori |
| 5,752,013 A | 5/1998 | Christensen et al. |
| 5,754,826 A | 5/1998 | Gamal et al. |
| 5,758,058 A | 5/1998 | Milburn |
| 5,781,747 A | 7/1998 | Smith et al. |
| 5,784,545 A | 7/1998 | Anderson et al. |
| 5,802,290 A | 9/1998 | Casselman |
| 5,805,792 A | 9/1998 | Swoboda et al. |
| 5,818,444 A | 10/1998 | Alimpich et al. |
| 5,828,693 A | 10/1998 | Mays et al. |
| 5,838,583 A | 11/1998 | Varadarajan et al. |
| 5,852,733 A | 12/1998 | Chien et al. |
| 5,867,399 A | 2/1999 | Rostoker et al. |
| 5,870,004 A | 2/1999 | Lu |
| 5,870,309 A | 2/1999 | Lawman |
| 5,870,345 A | 2/1999 | Stecker |
| 5,872,464 A | 2/1999 | Gradinariu |
| 5,874,958 A | 2/1999 | Ludolph |
| 5,878,425 A | 3/1999 | Redpath |
| 5,880,598 A | 3/1999 | Duong |
| 5,883,623 A | 3/1999 | Cseri |
| 5,889,936 A | 3/1999 | Chan |
| 5,889,988 A | 3/1999 | Held |
| 5,895,494 A | 4/1999 | Scalzi et al. |
| 5,898,345 A | 4/1999 | Namura et al. |
| 5,898,595 A | 4/1999 | Bair et al. |
| 5,901,062 A | 5/1999 | Burch et al. |
| 5,903,718 A | 5/1999 | Marik |
| 5,911,059 A | 6/1999 | Profit, Jr. |
| 5,930,150 A | 7/1999 | Cohen et al. |
| 5,933,356 A | 8/1999 | Rostoker et al. |
| 5,933,816 A | 8/1999 | Zeanah et al. |
| 5,939,949 A | 8/1999 | Olgaard et al. |
| 5,964,893 A | 10/1999 | Circello et al. |
| 5,966,532 A | 10/1999 | McDonald et al. |
| 5,968,135 A | 10/1999 | Teramoto et al. |
| 5,982,229 A | 11/1999 | Wong et al. |
| 5,983,277 A | 11/1999 | Heile et al. |
| 5,987,246 A | 11/1999 | Thomsen et al. |
| 5,999,725 A | 12/1999 | Barbier et al. |
| 6,002,398 A | 12/1999 | Wilson |
| 6,009,270 A | 12/1999 | Mann |
| 6,012,835 A | 1/2000 | Thompson et al. |
| 6,014,135 A | 1/2000 | Fernandes |
| 6,016,554 A | 1/2000 | Skrovan et al. |
| 6,016,563 A | 1/2000 | Fleisher |
| 6,018,559 A | 1/2000 | Azegami et al. |
| 6,032,268 A | 2/2000 | Swoboda et al. |
| 6,034,538 A | 3/2000 | Abramovici |
| 6,038,551 A | 3/2000 | Barlow et al. |
| 6,052,524 A | 4/2000 | Pauna |
| 6,058,263 A | 5/2000 | Voth |
| 6,075,941 A | 6/2000 | Itoh et al. |
| 6,094,730 A | 7/2000 | Lopez et al. |
| 6,107,769 A | 8/2000 | Saylor et al. |
| 6,107,826 A | 8/2000 | Young et al. |
| 6,110,223 A | 8/2000 | Southgate et al. |
| 6,121,965 A | 9/2000 | Kenney et al. |
| 6,128,768 A | 10/2000 | Ho |
| 6,134,516 A | 10/2000 | Wang et al. |
| 6,140,853 A | 10/2000 | Lo |
| 6,144,327 A | 11/2000 | Distinti et al. |
| 6,157,270 A | 12/2000 | Tso |
| 6,161,199 A | 12/2000 | Szeto et al. |
| 6,166,367 A | 12/2000 | Cho |
| 6,169,383 B1 | 1/2001 | Johnson |
| 6,173,419 B1 | 1/2001 | Barnett |
| 6,175,949 B1 | 1/2001 | Gristede et al. |
| 6,185,522 B1 | 2/2001 | Bakker |
| 6,188,975 B1 | 2/2001 | Gay |
| 6,191,660 B1 | 2/2001 | Mar et al. |

| Patent | Type | Date | Name | Patent | Type | Date | Name | Ref |
|---|---|---|---|---|---|---|---|---|
| 6,202,044 | B1 | 3/2001 | Tzori | 6,564,179 | B1 | 5/2003 | Belhaj | |
| 6,205,574 | B1 | 3/2001 | Dellinger et al. | 6,567,426 | B1 | 5/2003 | van Hook et al. | |
| 6,211,741 | B1 | 4/2001 | Dalmia | 6,575,373 | B1 | 6/2003 | Nakano | |
| 6,223,144 | B1 | 4/2001 | Barnett et al. | 6,578,174 | B2 * | 6/2003 | Zizzo | 716/103 |
| 6,223,147 | B1 | 4/2001 | Bowers | 6,581,191 | B1 | 6/2003 | Schubert et al. | |
| 6,223,272 | B1 | 4/2001 | Coehlo et al. | 6,587,995 | B1 | 7/2003 | Duboc et al. | |
| 6,225,866 | B1 | 5/2001 | Kubota et al. | 6,588,004 | B1 | 7/2003 | Southgate et al. | |
| 6,239,798 | B1 | 5/2001 | Ludolph et al. | 6,592,626 | B1 | 7/2003 | Bauchot et al. | |
| 6,240,375 | B1 | 5/2001 | Sonoda | 6,594,799 | B1 | 7/2003 | Robertson et al. | |
| 6,246,410 | B1 | 6/2001 | Bergeron et al. | 6,598,178 | B1 | 7/2003 | Yee et al. | |
| 6,249,167 | B1 | 6/2001 | Oguchi et al. | 6,601,236 | B1 | 7/2003 | Curtis | |
| 6,249,795 | B1 | 6/2001 | Douglis | 6,603,330 | B1 | 8/2003 | Snyder | |
| 6,253,282 | B1 | 6/2001 | Gish | 6,604,179 | B2 | 8/2003 | Volk et al. | |
| 6,263,302 | B1 | 7/2001 | Hellestrand et al. | 6,606,731 | B1 | 8/2003 | Baum et al. | |
| 6,263,339 | B1 | 7/2001 | Hirsh | 6,608,472 | B1 | 8/2003 | Kutz et al. | |
| 6,263,484 | B1 | 7/2001 | Yang | 6,611,220 | B1 | 8/2003 | Snyder | |
| 6,272,646 | B1 | 8/2001 | Rangasayee et al. | 6,611,276 | B1 | 8/2003 | Muratori et al. | |
| 6,282,547 | B1 | 8/2001 | Hirsh | 6,611,856 | B1 | 8/2003 | Liao et al. | |
| 6,282,551 | B1 | 8/2001 | Anderson et al. | 6,611,952 | B1 | 8/2003 | Prakash et al. | |
| 6,289,300 | B1 | 9/2001 | Brannick et al. | 6,613,098 | B1 | 9/2003 | Sorge et al. | |
| 6,289,489 | B1 | 9/2001 | Bold et al. | 6,614,320 | B1 | 9/2003 | Sullam et al. | |
| 6,294,962 | B1 | 9/2001 | Mar | 6,614,458 | B1 | 9/2003 | Lambert et al. | |
| 6,298,320 | B1 | 10/2001 | Buckmaster et al. | 6,618,854 | B1 | 9/2003 | Mann | |
| 6,304,101 | B1 | 10/2001 | Nishihara | 6,631,508 | B1 | 10/2003 | Williams | |
| 6,304,790 | B1 | 10/2001 | Nakamura et al. | 6,634,008 | B1 | 10/2003 | Dole | |
| 6,314,530 | B1 | 11/2001 | Mann | 6,637,015 | B1 | 10/2003 | Ogami et al. | |
| 6,321,369 | B1 | 11/2001 | Heile et al. | 6,658,633 | B2 | 12/2003 | Devins et al. | |
| 6,332,201 | B1 | 12/2001 | Chin et al. | 6,664,978 | B1 | 12/2003 | Kekic et al. | |
| 6,338,109 | B1 | 1/2002 | Snyder et al. | 6,667,642 | B1 | 12/2003 | Moyal | |
| 6,342,907 | B1 | 1/2002 | Petty et al. | 6,678,877 | B1 | 1/2004 | Perry et al. | |
| 6,345,383 | B1 | 2/2002 | Ueki | 6,681,280 | B1 | 1/2004 | Miyake et al. | |
| 6,347,395 | B1 | 2/2002 | Payne et al. | 6,691,301 | B2 * | 2/2004 | Bowen | 717/114 |
| 6,353,452 | B1 | 3/2002 | Hamada et al. | 6,697,754 | B1 | 2/2004 | Alexander | |
| 6,356,862 | B2 | 3/2002 | Bailey | 6,701,487 | B1 | 3/2004 | Ogami et al. | |
| 6,366,300 | B1 | 4/2002 | Ohara et al. | 6,701,508 | B1 | 3/2004 | Bartz et al. | |
| 6,366,874 | B1 | 4/2002 | Lee et al. | 6,711,731 | B2 | 3/2004 | Weiss | |
| 6,366,878 | B1 | 4/2002 | Grunert | 6,715,132 | B1 | 3/2004 | Bartz et al. | |
| 6,369,660 | B1 | 4/2002 | Wei et al. | 6,718,520 | B1 | 4/2004 | Merryman et al. | |
| 6,374,370 | B1 | 4/2002 | Bockhaus et al. | 6,718,533 | B1 | 4/2004 | Schneider et al. | |
| 6,377,646 | B1 | 4/2002 | Sha | 6,748,569 | B1 | 6/2004 | Brooke et al. | |
| 6,385,742 | B1 | 5/2002 | Kirsch et al. | 6,750,889 | B1 | 6/2004 | Livingston et al. | |
| 6,397,232 | B1 | 5/2002 | Cheng-Hung et al. | 6,757,882 | B2 | 6/2004 | Chen et al. | |
| 6,404,445 | B1 | 6/2002 | Galea et al. | 6,765,407 | B1 | 7/2004 | Snyder | |
| 6,408,432 | B1 | 6/2002 | Herrmann et al. | 6,769,622 | B1 | 8/2004 | Tournemille et al. | |
| 6,411,974 | B1 | 6/2002 | Graham et al. | 6,771,552 | B2 | 8/2004 | Fujisawa | |
| 6,425,116 | B1 | 7/2002 | Duboc et al. | 6,784,821 | B1 | 8/2004 | Lee | |
| 6,429,882 | B1 | 8/2002 | Abdelnur et al. | 6,785,881 | B1 | 8/2004 | Bartz et al. | |
| 6,434,187 | B1 | 8/2002 | Beard et al. | 6,792,584 | B1 | 9/2004 | Eneboe et al. | |
| 6,437,805 | B1 | 8/2002 | Sojoodi et al. | 6,798,299 | B1 | 9/2004 | Mar et al. | |
| 6,438,565 | B1 | 8/2002 | Ammirato et al. | 6,810,442 | B1 | 10/2004 | Lin et al. | |
| 6,438,729 | B1 | 8/2002 | Ho | 6,816,544 | B1 | 11/2004 | Bailey et al. | |
| 6,438,735 | B1 | 8/2002 | McElvain et al. | 6,823,282 | B1 | 11/2004 | Snyder | |
| 6,438,738 | B1 | 8/2002 | Elayda | 6,823,497 | B2 | 11/2004 | Schubert et al. | |
| 6,445,211 | B1 | 9/2002 | Saripella | 6,825,689 | B1 | 11/2004 | Snyder | |
| 6,449,755 | B1 | 9/2002 | Beausang et al. | 6,829,727 | B1 | 12/2004 | Pawloski | |
| 6,449,761 | B1 | 9/2002 | Greidinger et al. | 6,854,067 | B1 | 2/2005 | Kutz et al. | |
| 6,453,461 | B1 | 9/2002 | Chaiken | 6,859,884 | B1 | 2/2005 | Sullam | |
| 6,456,304 | B1 | 9/2002 | Angiulo et al. | 6,865,429 | B1 | 3/2005 | Schneider et al. | |
| 6,460,172 | B1 | 10/2002 | Insenser Farre et al. | 6,865,504 | B2 | 3/2005 | Larson et al. | |
| 6,466,898 | B1 | 10/2002 | Chan | 6,868,500 | B1 | 3/2005 | Kutz et al. | |
| 6,477,691 | B1 | 11/2002 | Bergamashi/Rab et al. | 6,871,331 | B1 | 3/2005 | Bloom et al. | |
| 6,487,700 | B1 | 11/2002 | Fukushima | 6,892,310 | B1 | 5/2005 | Kutz et al. | |
| 6,499,134 | B1 | 12/2002 | Buffet et al. | 6,892,322 | B1 | 5/2005 | Snyder | |
| 6,507,214 | B1 | 1/2003 | Snyder | 6,898,703 | B1 | 5/2005 | Ogami et al. | |
| 6,507,857 | B1 | 1/2003 | Yalcinalp | 6,901,563 | B1 | 5/2005 | Ogami et al. | |
| 6,516,428 | B2 | 2/2003 | Wenzel et al. | 6,910,126 | B1 | 6/2005 | Mar et al. | |
| 6,525,593 | B1 | 2/2003 | Mar | 6,922,821 | B1 | 7/2005 | Nemecek | |
| 6,529,791 | B1 | 3/2003 | Takagi | 6,950,954 | B1 | 9/2005 | Sullam et al. | |
| 6,530,065 | B1 | 3/2003 | McDonald et al. | 6,950,990 | B2 | 9/2005 | Rajarajan et al. | |
| 6,535,946 | B1 | 3/2003 | Bryant et al. | 6,952,778 | B1 | 10/2005 | Snyder | |
| 6,536,028 | B1 | 3/2003 | Katsioulas et al. | 6,957,180 | B1 | 10/2005 | Nemecek | |
| 6,539,534 | B1 | 3/2003 | Bennett | 6,957,242 | B1 | 10/2005 | Snyder | |
| 6,542,025 | B1 | 4/2003 | Kutz et al. | 6,967,511 | B1 | 11/2005 | Sullam | |
| 6,542,844 | B1 | 4/2003 | Hanna | 6,967,960 | B1 | 11/2005 | Bross et al. | |
| 6,553,057 | B1 | 4/2003 | Sha et al. | 6,968,346 | B2 | 11/2005 | Hekmatpour | |
| 6,557,164 | B1 | 4/2003 | Faustini | 6,970,844 | B1 | 11/2005 | Bierenbaum | |
| 6,560,306 | B1 | 5/2003 | Duffy et al. | 6,981,090 | B1 | 12/2005 | Kutz et al. | |
| 6,560,699 | B1 | 5/2003 | Konkle | 6,996,799 | B1 | 2/2006 | Cismas et al. | |
| 6,563,391 | B1 | 5/2003 | Mar | 7,005,933 | B1 | 2/2006 | Shutt | |

| | | |
|---|---|---|
| 7,017,145 B2 | 3/2006 | Taylor |
| 7,023,257 B1 | 4/2006 | Sullam |
| 7,024,636 B2* | 4/2006 | Weed .................. 716/102 |
| 7,024,654 B2 | 4/2006 | Bersch et al. |
| 7,055,035 B2 | 5/2006 | Allison et al. |
| 7,073,158 B2* | 7/2006 | McCubbrey .................. 716/104 |
| 7,076,420 B1 | 7/2006 | Snyder et al. |
| 7,086,014 B1 | 8/2006 | Bartz et al. |
| 7,089,175 B1 | 8/2006 | Nemecek et al. |
| 7,092,980 B1 | 8/2006 | Mar et al. |
| 7,099,818 B1 | 8/2006 | Nemecek et al. |
| 7,103,108 B1 | 9/2006 | Beard |
| 7,117,485 B2 | 10/2006 | Wilkinson et al. |
| 7,124,376 B2 | 10/2006 | Zaidi et al. |
| 7,127,630 B1 | 10/2006 | Snyder |
| 7,149,316 B1 | 12/2006 | Kutz et al. |
| 7,150,002 B1 | 12/2006 | Anderson et al. |
| 7,162,410 B1 | 1/2007 | Nemecek et al. |
| 7,171,455 B1 | 1/2007 | Gupta et al. |
| 7,180,342 B1 | 2/2007 | Shutt et al. |
| 7,185,162 B1 | 2/2007 | Snyder |
| 7,185,321 B1 | 2/2007 | Roe et al. |
| 7,221,187 B1 | 5/2007 | Snyder et al. |
| 7,236,921 B1 | 6/2007 | Nemecek et al. |
| 7,266,768 B2 | 9/2007 | Ferlitsch et al. |
| 7,283,151 B2 | 10/2007 | Nihei et al. |
| 7,376,904 B2 | 5/2008 | Cifra et al. |
| 7,386,740 B2 | 6/2008 | Kutz et al. |
| 7,406,674 B1 | 7/2008 | Ogami et al. |
| 2001/0002129 A1 | 5/2001 | Zimmerman et al. |
| 2001/0044927 A1 | 11/2001 | Karniewicz |
| 2001/0047509 A1 | 11/2001 | Mason et al. |
| 2002/0010716 A1 | 1/2002 | McCartney et al. |
| 2002/0016706 A1 | 2/2002 | Cooke et al. |
| 2002/0023110 A1 | 2/2002 | Fortin et al. |
| 2002/0042696 A1 | 4/2002 | Garcia et al. |
| 2002/0052729 A1 | 5/2002 | Kyung et al. |
| 2002/0068989 A1 | 6/2002 | Ebisawa et al. |
| 2002/0073119 A1 | 6/2002 | Richard |
| 2002/0073380 A1 | 6/2002 | Cooke |
| 2002/0085020 A1 | 7/2002 | Carroll, Jr. |
| 2002/0100003 A1 | 7/2002 | McBride |
| 2002/0109722 A1 | 8/2002 | Rogers et al. |
| 2002/0116168 A1 | 8/2002 | Kim |
| 2002/0121679 A1 | 9/2002 | Bazarjani et al. |
| 2002/0122060 A1 | 9/2002 | Markel |
| 2002/0129334 A1 | 9/2002 | Dane et al. |
| 2002/0138516 A1 | 9/2002 | Igra |
| 2002/0152234 A1 | 10/2002 | Estrada et al. |
| 2002/0152449 A1 | 10/2002 | Lin |
| 2002/0156885 A1 | 10/2002 | Thakkar |
| 2002/0156998 A1 | 10/2002 | Casselman |
| 2002/0161802 A1 | 10/2002 | Gabrick et al. |
| 2002/0166100 A1 | 11/2002 | Meding |
| 2002/0166103 A1 | 11/2002 | Rittman et al. |
| 2002/0174134 A1 | 11/2002 | Goykhman |
| 2003/0014447 A1 | 1/2003 | White |
| 2003/0025734 A1 | 2/2003 | Boose et al. |
| 2003/0028772 A1 | 2/2003 | Allison et al. |
| 2003/0041235 A1 | 2/2003 | Meyer |
| 2003/0056071 A1 | 3/2003 | Triece et al. |
| 2003/0058469 A1 | 3/2003 | Buis et al. |
| 2003/0061572 A1 | 3/2003 | McClannahan et al. |
| 2003/0135842 A1 | 7/2003 | Frey et al. |
| 2003/0149961 A1 | 8/2003 | Kawai et al. |
| 2003/0229482 A1 | 12/2003 | Cook et al. |
| 2003/0229877 A1 | 12/2003 | Bersch et al. |
| 2004/0054821 A1 | 3/2004 | Warren et al. |
| 2004/0060032 A1 | 3/2004 | McCubbrey |
| 2004/0098689 A1 | 5/2004 | Weed |
| 2004/0205553 A1 | 10/2004 | Hall et al. |
| 2004/0205617 A1 | 10/2004 | Light |
| 2004/0205695 A1 | 10/2004 | Fletcher |
| 2004/0221238 A1 | 11/2004 | Cifra et al. |
| 2005/0108663 A1* | 5/2005 | Bentley et al. .................. 716/1 |
| 2005/0240917 A1 | 10/2005 | Wu |
| 2006/0117274 A1* | 6/2006 | Tseng et al. .................. 716/1 |

OTHER PUBLICATIONS

"PSoC Designer: Integrated Development Environment" User Guide; Revision 1.11; Last Revised Jul. 17, 2001; 109 pages.

"PSoC designer: Integrated development environment, getting started 25-minute tutorial, version 1.0", Cypress Microsystems., Cypress Microsystems, Inc. CMS10006A, Jul. 3, 2001; 25 pages.

U.S. Appl. No. 11/201,627: "Method and an apparatus to design a processing system using a graphical user interface," Ogami et al., filed on Aug. 10, 2005; 37 pages.

U.S. Appl. No. 09/989,808: "Automatic generation of application program interfaces, source code, interrupts, and data sheets for microcontroller programming," Bartz et al., filed on Nov. 19, 2001; 67 pages.

USPTO Non-Final Rejection for U.S Appl. No. 10/113,065 dated May 20, 2005; 14 pages.

USPTO Non-Final Rejection for U.S. Appl. No. 09/975,338 dated Aug. 14, 2007; 19 pages.

USPTO Non-Finai Rejectioin for U.S. Appl. No. 09/975,338 dated Sep. 6, 2006: 11 pages.

USPTO Non-Finai Rejection for U.S. Appl. No. 10/324,455 dated Aug. 21, 2003: 4 pages.

USPTO Non-Final Rejection for U.S. Appl. No. 10/324,455 dated Nov. 6, 2003; 4 pages.

USPTO Non-Final Rejectim for U.S. Appl. No. 11/201,922 dated Jun. 11, 2010; 12 pages.

USPTO Non-Finat Rejection for U.S. Appl. No. 11/201,922 dated Oct. 15, 2007; 10 pages.

USPTO Nan-Final Rejection for U.S. Appl. No. 11/201,922 dated Oct. 21, 2008; 12 pages.

USPTO Non-Final Rejection for U.S. Appl. No. 11/201,922 dated Dec. 28, 2010, 14 pages.

USPTO Non-FinW Rejection for U.S. Appl. No. 09/975,338 dated Apr. 5, 2005; 13 pages.

USPTO Notice of Allowance for U.S. Appl. 09/975,105 dated Dec. 4, 2006; 4 pages.

USPTO Notice of Allowance for U.S. Appl. No. 09/998,834 dated May 19, 2005; 7 pages.

USPTO Notice of Allowance for U.S. Appl. No. 09/998,859 dated Mar. 14, 2005; 6 pages.

USPTO Notice of Allowance for U.S. Appl. No. 10/008,096 dated Dec. 22, 2008; 24 pages.

USPTO Notice of Allowance for U.S. Appl. No. 10/113,065 dated Apr. 6, 2006; 8 pages.

USPTO Notice of Allowance for U.S. Appl. No. 10/001,477 dated May 8, 2009; 6 pages.

USPTO Notice of Allowance for U.S. Appl. No. 10/324,455 dated Feb. 12, 2004; 4 pages.

USPTO Notice of Allowance for U.S. Appl. No. 11/201,922 dated Apr. 9, 2009; 4 pages.

USPTO Notice of Allowance for U.S. Appl. No. 11/201,922 dated Jun. 7, 2012; 5 pages.

USPTO Notice of Allowance for U.S. Appl. No. 11/201,922 dated Jul. 26, 2012, 5 pages.

USPTO Notice of Allowance for U.S. Appl. No. 11/201,922 dated Oct. 11, 2011; 5 pages.

Virtex II Pro Platform FPGA Developer's Kit, "How Data2BRAM Fits in with Hardware and Software Flows", Chapter 2: Using Data2BRAM, Jan. 2003 Release by Xylinx Inc., pp. 118-119.

Wang, et al, "Synthesizing Operating System Based Device Drivers in Embedded Systems," Oct. 1-3, 2003; ACM, pp. 37-44; 8 pages.

Written Opinion for International Application No. PCT/US05/28793 mailed Nov. 30, 2007; 7 pages.

U.S. Appl. No. 09/201,912: "Circuit(s), Architecture and Method(s) for Operating and/or Tuning a Ring Oscillator," Monte Mar, filed on Dec. 9, 1998; 23 pages.

U.S. Appl. No. 09/943,062, "Apparatus and Method for Programmable Power Management in a Programmable Analog Circuit Block," Monte Mar, filed on Aug. 29, 2001; 46 pages.

U.S. Appl. No. 10/236,966: "Method for Parameterizing a User Module," Perrin et al., filed on Sep. 9, 2002; 41 pages.

Burogs et al, "Power Converter Analysis and Design using Matlab: A Transfer Function Approach," Proceedings of IEEE International Symposium on Industrial Electronics 1996, vol. 2, pp. 552-557; 6 pages.

Efstathiou, "Anatog Electronics: Basic Circuits of Operational Amplifiers," <http://web.archive.org/web/20021231045232> Dec. 31, 2002, version, retrieved from the Internet Archives; 10 pages.

International Search Report and Written Opinion of the International Searching Authority for PCT/US05/28898, filed Aug. 12, 2005, mailed Mar. 6, 2007; 6 pages.

International Search Report for International Application No. PCT/US05/28793 mailed Dec. 6, 2007; 8 pages.

Lutovac et al. "Symbolic Computation of Digital Filter Transfer Function Using MATLAB," Proceedings of 23rd International Conference on Microelectronics. vol. 2 NIS, Yugoslavia, May 2002, pp. 651-654; 4 pages.

Nouta et al, "Design and FPGA-Implementation of Wave Digital Bandpass Fitters with Arbitrary Amplitude Transfer Characteristics," Proceedings of IEEE International Symposium on Industrial Electronics; 1998, vol. 2; 5 pages.

U.S. Appl. No. 60/601,263: "Model for a hardware device-independent method of defining embedded firmware for programmable systems," John McDonald, filed on Aug. 13, 2004; 132 pages.

U.S. Appl. No. 11/200,619, Non Final Office Action Mailed Aug. 27, 2008; 13 pages.

U.S. Appl. No. 11/201,627, Non-Final Office Action mailed Dec. 12, 2008; 17 pages.

U.S. Appl. No. 11/201,627, Non-Final Office Action dated Nov. 16, 2007; 16 pages.

USPTO Advisory Action for U.S. Appl. No. 09/975,338 dated May 15, 2006; 4 pages.

USPTO Final Rejection for U.S. Appl. No. 09/975,105 dated Jul. 13, 2006; 7 pages.

USPTO Final Rejection for U.S Appl. No. 09/975,115 dated Feb. 21, 2006; 25 pages.

USPTO Final Rejection for U.S. Appl. No. 09/975,115 dated May 12, 2008; 33 pages.

USPTO Final Rejection for U.S. Appl. No. 09/975,115 dated Jun. 23, 2006; 20 pages.

USPTO Final Rejection for U.S. Appl. No. 09/998,859 dated Nov. 19, 2003; 5 pages.

USPTO Final Rejection for U.S. Appl. No. 10/008,096 dated Feb. 10, 2005, 15 pages.

USPTO Final Rejection for U.S. Appl. No. 10/008,096 dated Jun. 16, 2008; 23 pages.

USPTO Final Rejection for U.S. Appl. No. 10/008,096 dated Sep. 4, 2007; 19 pages.

USPTO Final Rejection for U.S. Appl. No. 10/008,096 dated Oct. 13, 2006; 17 pages.

USPTO Final Rejection for U.S. Appl. No. 10/008,096 dated Nov. 25, 2005; 17 pages.

USPTO Final Rejection for U.S. Appl. No. 10/113,065 dated Oct. 26, 2005, 17 pages.

USPTO Final Rejection for U.S. Appl. No. 09/975,338 dated Jan. 18, 2006; 12 pages.

USPTO Final Rejection for U.S. Appl. No. 09/975,338 dated Jan. 31, 2008; 21 pages.

USPTO Final Rejection for U.S. Appl. No. 09/975,338 dated Feb. 27, 2007; 23 pages.

USPTO Final Rejection for U.S. Appl. No. 11/201,627 dated Apr. 29, 2008; 21 pages.

USPTO Final Rejection for U.S. Appl. No. 11/201,922 dated Apr. 30, 2008; 10 pages.

USPTO Final Rejection for U.S. Appl. No. 11/201,922 dated May 31, 2011; 9 pages.

USPTO Non-Final Rejection for U.S. Appl. No. 09/975,105 dated Jan. 19, 2006; 5 pages.

USPTO Non-Final Rejection for U.S. Appl. No. 09/975,105 dated Apr. 19, 2005; 9 pages.

USPTO Non-Final Rejection for U.S. Appl. No. 09/975,115 dated Jan. 7, 2008; 30 pages.

USPTO Non-Final Rejection for U.S. Appl. No. 09/975,115 dated Jan. 11, 2006; 15 pages.

USPTO Non-Final Rejection for U.S. Appl. No. 09/975,115 dated Feb. 11, 2005; 86 pages.

USPTO Non-Final Rejection for U.S. Appl. No. 09/975,115 dated Jul. 27, 2005; 11 pages.

USPTO Non-FinW Rejection for U.S. Appl. No. 09/975,115 dated Jul. 31, 2007; 28 pages.

USPTO Non-Final Rejection for U.S. Appl. No. 09/975,115 dated Oct. 9, 2008; 34 pages.

USPTO Non-Final Rejection for U.S. Appl. No. 09/975,115 dated Oct. 31, 2006; 19 pages.

USPTO Non-Final Rejection for U.S. Appl. No. 09/998,834 dated Sep. 20, 2004; 11 pages.

USPTO Non-Finai Rejectipn for U.S. Appl. No. 09/998,859 dated May 15, 2003; 6 pages.

USPTO Non-Final Rejection for U.S. Appl. No. 09/998,859 dated May 28, 2003; 6 pages.

USPTO Non-Final Rejection for U.S. Appl. No. 09/998,859 dated Nov. 4, 2004; 6 pages.

USPTO Non-Final Rejection for U.S. Appl. No. 10/008,096 dated Mar. 7, 2007; 19 pages.

USPTO Non-Final Rejection for U.S. Appl. No. 10/008,096 dated Apr. 17, 2006; 18 pages.

USPTO Non-Final Rejection for U.S. Appl. No. 10/008,096 dated Jun. 14, 2004; 24 pages.

USPTO Non-Final Rejection for U.S. Appl. No. 10/008,096 dated Jun. 24, 2005; 15 pages.

USPTO Non-Final Rejection for U.S. Appl. No. 10/008,096 dated Dec. 12, 2007; 14 pages.

* cited by examiner

FIG. 6

MODEL FOR A HARDWARE DEVICE-INDEPENDENT METHOD OF DEFINING EMBEDDED FIRMWARE FOR PROGRAMMABLE SYSTEMS

RELATED APPLICATION

This application is a continuation of U.S. application Ser. No. 11/201,922, filed Aug. 10, 2005, which claims the benefit of U.S. Provisional Application No. 60/601,263, filed Aug. 13, 2004, the entire contents of each of which are incorporated by reference herein.

TECHNICAL FIELD

The present invention relates generally to electronic circuits and in particular the programming of processing devices.

BACKGROUND

Processing devices, such as microcontrollers, field programmable arrays, etc., are widely used in the industry as control elements in many solutions. Most processing devices are general in purpose and are designed for use in a wide variety of problem solutions. As processing devices become more programmable and more widely applicable, a designer needs more specific device knowledge to select and use the appropriate processing device to solve a problem. For example, a Cypress MicroSystem's Programmable System on a Chip™ microcontroller (PSoC™ microcontroller) device may be the most widely applicable microcontroller devices currently on the market. Broadly applicable devices require a high amount of device specific knowledge to program the device to fit a variety of solutions. Unfortunately, many engineers charged with designing a system level solution do not possess the required specific knowledge to create the low level program of the solution for the device.

In a conventional solution using processing devices, hardware and software are usually created for a specific processing device, and may be redesigned (sometimes completely) following a change in requirements. The faster the time-to-market or the shorter the design, the more likely requirement changes are to occur. A common sequence of events is to first determine the system requirements to address a problem, then second to determine hardware and software requirements, then third to determine processing device and interfacing circuitry requirements, and fourth to find a suitable processing device and design suitable interfaces. Finally, the user must manually configure the processing device and write device specific firmware. In some cases, the user/programmer may have to re-write firmware, redesign circuitry, or choose another processing device based upon changing requirements.

These changing requirements result in one or all of costly and inefficient code changes and software and hardware architecture changes, which might also require a change in the processing device and/or significant redesign of the entire project. Such a redesign may be costly and further delay design and production schedules.

BRIEF DESCRIPTION OF THE DRAWINGS

The present invention is illustrated by way of example, and not by way of limitation, in the figures of the accompanying drawings in which.

DETAILED DESCRIPTION

In the following detailed description, numerous specific details are set forth in order to provide a thorough understanding of the invention. However, it will be understood by those skilled in the art that certain embodiments of the present invention may be practiced without these specific details. In other instances, well-known methods, procedures, components, and circuits have not been described in detail so as not to obscure the presented embodiments of the invention. The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

The following detailed description refers to programming processing devices based on a user created system level solution. It can be appreciated by those skilled in the art that a processing device (e.g., processing device 106 of FIG. 1) as referred to in the programming process, may include one or more general-purpose programmable processing devices, such as a microcontroller, an embedded programmable logic device (PLD), or the like. Alternatively, the processing device may include one or more special-purpose programmable processing devices, such as an application specific integrated circuit (ASIC), a field programmable gate array (FPGA), or the like. The processing device may also include any combination of a general-purpose programmable processing device and a special-purpose programmable processing device. Additionally, the processing device to be programmed may include a larger circuit which incorporates any one or more of the named devices above.

Figure 1:
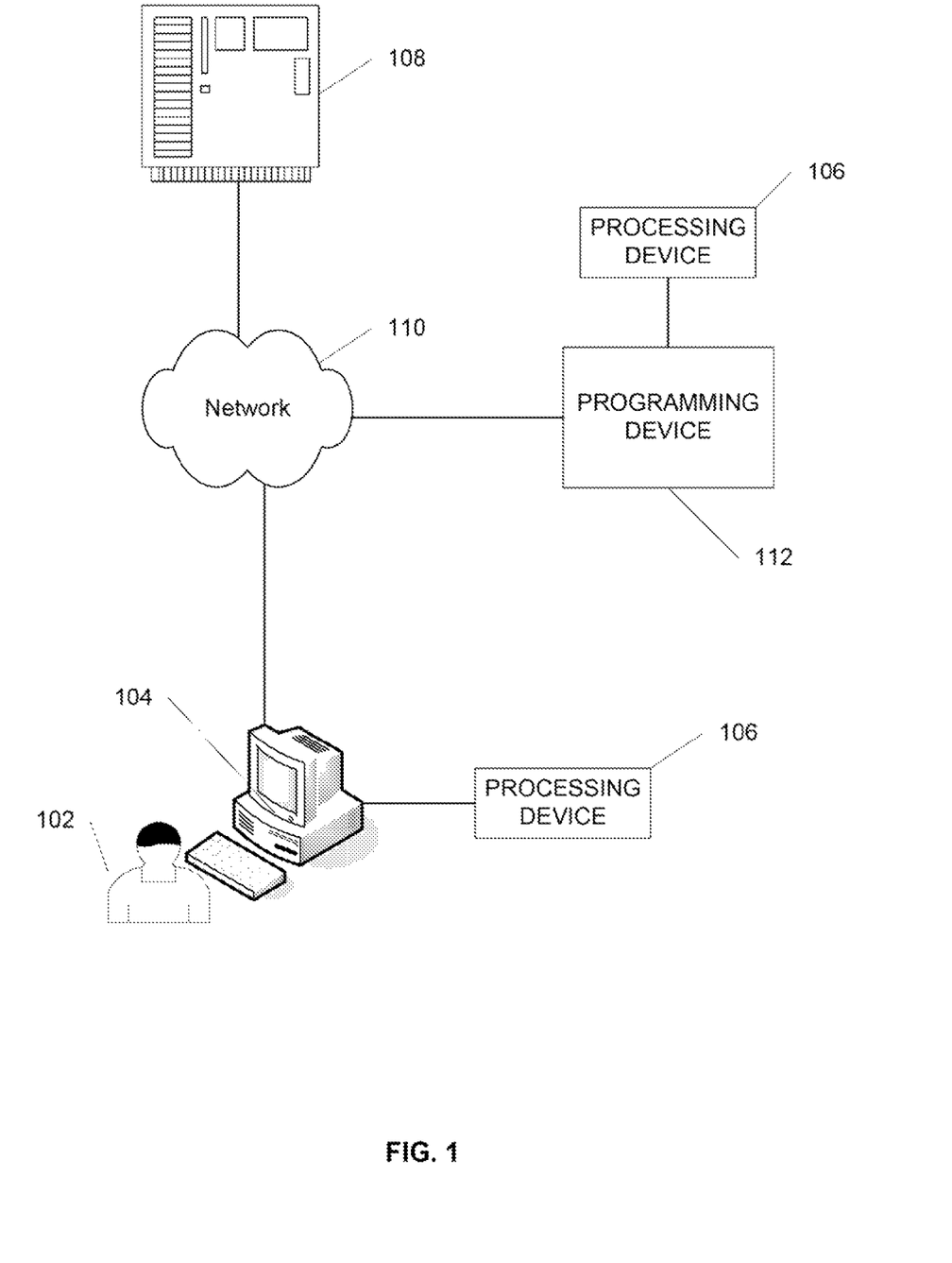
FIG. 1 is a high level diagram illustrating multiple system level architectures for the programming of processing devices, according to various embodiments of the present invention.

FIG. 1 is a high level diagram illustrating multiple system level architectures for the programming of processing devices, according to various embodiments of the present invention. A user 102 is provided with a high level of abstraction to build a system level solution without prior knowledge and expertise of a particular programming device (e.g., processing device 106). The system level solution allows for lower level processes invisible to the user 102 to verify the system level solution, provide potential processing devices that may fit the design, and to build the design into an embedded programmable system solution that may be used to program a selected processing device.

In one embodiment, an application or program generates a GUI (graphical user interface, not shown) on computer 104 that permits a user 102 to interactively select, combine, and program a multitude of functional elements to generate a system level solution to be programmed on the processing device 106 (e.g., microcontroller, etc.). In various embodiments, the application or applications responsible for the GUI and system level solution processing may be wholly or partially running on computer 104 or may be wholly or partially running a remote device, such as server 108 in communication with computer 104 through network 110. This allows for user 102 to create a system level solution from a location remote from a system configured to generate the embedded programmable system solution and/or to physically program the processing device 106.

Once the user 102 has completed the system level solution, the user may select from one or more possible processing devices derived from processing the system level solution, either remotely or locally. Processing of the system level solution to create the embedded programmable system solution is controlled and facilitated by lower level processes invisible to the user 102. After the processing device 106 has been selected, a programming device 112, under control of the lower level processes, creates a programming image file 222 (See FIG. 2) and programs the processing device 106 accordingly. The physical programming the processing device 106 may occur locally or remotely. For example, the computer 104 may include a programming device module to program processing device 106 in a similar fashion to programming device 112. In another embodiment, the programming device 112 may be located remotely and configured to program the processing device 106 based on receiving the programming file from either the computer 104 or the server 108 through network 110.

Figure 2:
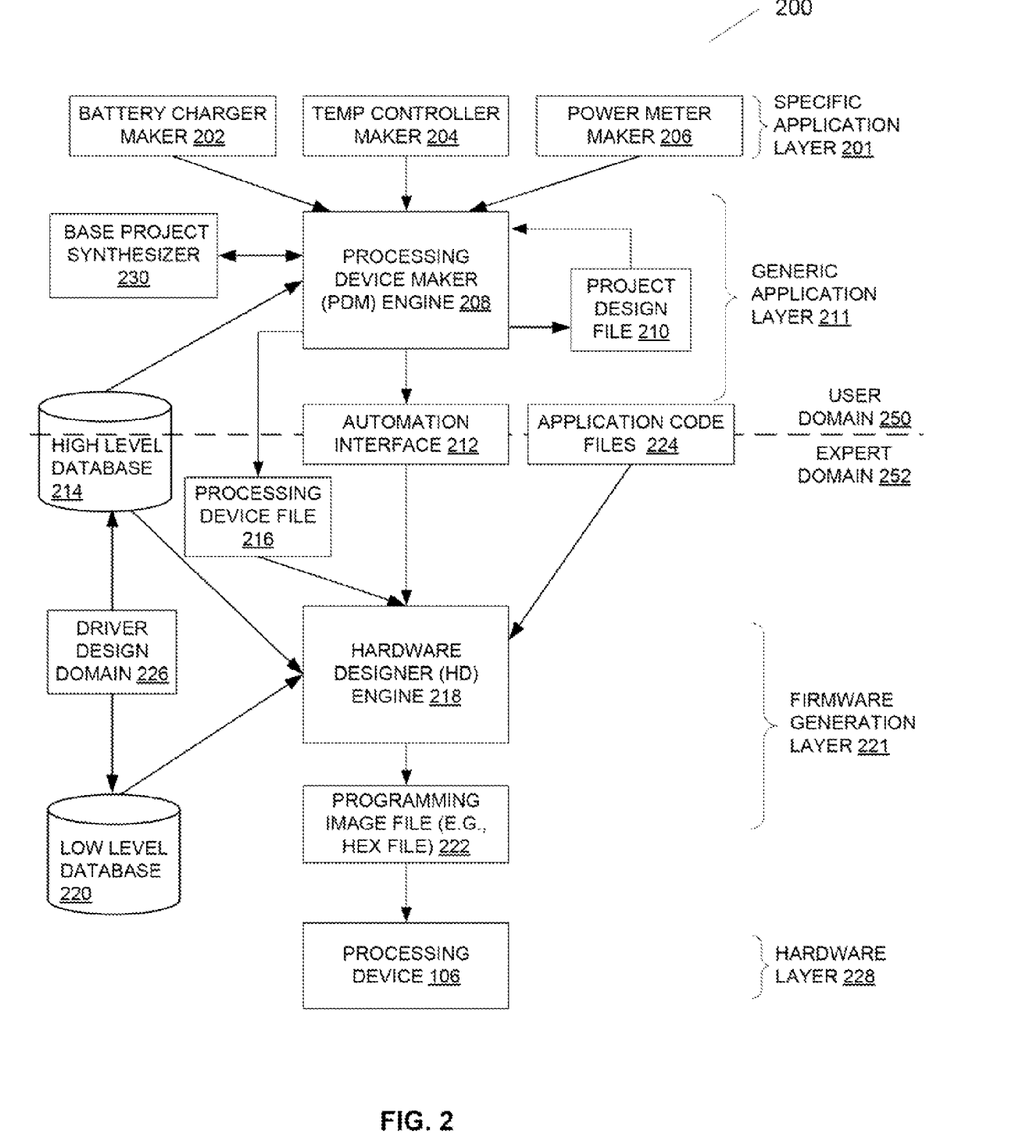
FIG. 2 is a block diagram illustrating components making up a programming system, according to one embodiment of the present invention.

FIG. 2 is a block diagram illustrating components making up a programming system 200, according to one embodiment of the present invention. The programming system 200 may be divided into two domains; a user domain 250 representing higher order processes and controls, and an expert domain 252 representing lower order processes and controls, which is an embedded development environment that requires a high level of expertise to develop embedded programmable system solutions. In one embodiment of the present invention, the user domain 250 may include the GUI of computer 104 that permits the user 102 to interactively select, combine, and program a multitude of high level functional elements to generate a system level solution. However, the system level solution must be converted in the expert domain 252 to the embedded programmable system solution, and more specifically into the programming image file 222 that may be used by the programming device 112 to program the processing device 106.

In the user domain 250, a specific application layer 201 includes the applications a battery charger maker 202, a temp controller maker 204, and a power meter maker 206, collectively known as applications 202, 204, 206. These are high level software applications which are visible to the user via the GUI of computer 104. The applications 202, 204, 206 are by example only, it can be appreciated that there may be a multitude of applications representing many kinds of devices and device functions. The applications 202, 204, 206 present options to the user 102 during the development of a system level solution. In one embodiment, the options are formatted metadata made available to each of the applications 202, 204, 206 for display to the user 102. The user 102 provides input selections or data based on these options, which may be captured in one or more files in various formats known in the art, such as HTML (hypertext markup language), XML (extended markup language), or any other format known in the art for structuring data in files. In one embodiment, the data is captured in a project design file 210, which is a single ASCII (American standard code for information interchange) file of XML.

In one embodiment, a processing device maker (PDM) engine 208 is a generic application in generic application layer 211 and is configured to receive and process data from the applications 202, 204, 206, and to dynamically update the project design file 210. The PDM engine 208 receives high level device drivers and associated device descriptions from a high level database 214. For example, the PDM engine 208 may provide the user 102, via the UI on the computer 104, a list of device elements based on the high level device descriptions, such as a temperature sensor, a fan, a voltage input, an LED (light emitting diode), etc. In one embodiment, the system level solution created by the user 102 may include one or a combination of device elements and associated functionality. Device elements include pin designations, inputs, and outputs, each of which may include operational attributes, such as a voltage input range for an input pin or a pushbutton switch that may be opened or closed. Additionally, the user 102 may also include operational instructions that include logic to activate device elements or portions thereof if a programmed condition occurs. For example, a user may use the GUI of computer 104 to program and simulate a fan switch to go to an 'on' state when the temperature sensor reads 100 degrees Celsius.

In one embodiment, as the user 102 makes connections within or between device elements and/or provides operational instructions, the PDM engine 208, in addition to updating the project design file 210, also verifies and validates the user the connections and operational instructions. A validation process ensures that the user 102 cannot create faulty interconnects, operational instructions, or create a system level solution that cannot be programmed into one of the available processing devices (e.g., processing device 106). For example, after each change during the design process the list of device elements and processing devices is dynamically updated such that the user 102 cannot make a faulty selection.

After the user 102 has created and simulated the system level solution, the PDM engine 208 creates a processing device file 216 based on the project design file 210 and the selected processing device 106. The processing device file 216 is a file specifically created to provide hardware designer (HD) engine 218 in the firmware generation layer 221 with the low level data necessary to build the created system level design into an embedded programmable system solution on a programmable image file 222 to be programmed on the selected processing device 106. In one embodiment, the processing device file 216 includes data pertaining to the locations in the low level database 220 for low level device drivers associated with one or more high level device drivers of the system level design in addition to all the appropriate links to the data required so the HD engine 218 may resolve the calls and functions. In various embodiments, the processing device file 216 may be HTML (hypertext markup language), XML (extended markup language), or any other format known in the art for structuring data in files.

An automation interface 212 is triggered by the PDM engine 208 and is configured to provide commands to launch the HD engine 218. These commands, among other things, instruct the HD engine 218 to find and open the processing device file 216 and perform the operations of low level code generation including pulling together all the necessary resources to compile and link the low level code to generate the programming image file 222. In various embodiments, the automation interface 212 provides the commands through a single command line string, a batch file, or a script file. In one embodiment, the automation interface 212 may be configured such that the PDM engine 208 is compatible with multiple HD engine types (e.g., different HD engine manufacturers) by altering the commands accordingly and updating the high level database 214 to reflect the device types associated with each of the multiple HD engine types.

Application code files 224 are custom files generated by the PDM engine 208 and include header files, 'include' files, and device driver information. The generated code in the application code files 224 is customized for the system level solution according to what device elements were called out by the user 102 and further includes code to control and operate the selected device elements. For example, the user 102 creates system level design that includes a temperature sensor controlling a fan with an LED status. The application code files 224 are generated creating a program to startup the fan based on device driver calls. Similar programs may be generated for the temperature sensor and the LED. In other words, the application code files 224 provide state information for the device elements of the system level design. In one embodiment, some or all of these functions are called out of a period task module or an event handler module. In one embodiment, the application code files 224 may be single file. In various embodiments, the application code files 224 may be generated in assembly programming language or in one of a multitude of variations of 'C' programming languages.

In one embodiment of the present invention, the HD engine 218 triggered by the commands received from the automation interface 212 assembles project data that includes a base project, lower level device drivers and user modules from the low level database 220 based on processing the low level design parameters described in the processing device file 216 and the operational code from the application code files 224. The HD engine 218 based on the project data builds the programming image file 222 that may be executed in the hardware layer 228 to program the embedded programmable system solution based on the system level solution created by the user 102.

The base project (not shown) is associated with the processing device 106 family chosen by the user 102. Base projects are one of the code elements comprised of metadata that are specific to the hardware platform chosen and set low-level hardware implementation details, such as the user modules required (which determine which kind of channels that can be supported) and the family and pin/package for the processing device. For example, to cover a family of devices having an 8, 20, 28, 44, and 48-pin package, five versions of the same base project would be required. Transparently to the user 102, a choice is made by the PDM engine 208 as to whether any or all of these can handle the system level solution defined by the user 102. For example, if the user 102 designs a simple 3 switch/3 LED design, all 5 base projects are presented, with the 8-pin presented as the top recommendation. In another example, if the user designs a 20 switch/20 LED design which requires 40 pins, only the 44 and 48 pin versions would be shown. In one embodiment, the base projects are designed and entered into the high level database 214 and/or the low level database 220 by processing device experts. In other embodiments, a base project synthesizer 230 dynamically creates the base projects by processing the project design file 210 to determine valid processing device configurations for the system level design. In various embodiments, the synthesized base projects may or may not be permanently or temporality stored in the high level database 214 and/or the low level database 220.

In one embodiment of the present invention, a device driver design domain 226 may provide scalability to the programming system 200. The user 102 or a third party processing device manufacturer could provide high level and low level design and driver information, and base project information that could be added to the high level database 214 and/or the low level database 220, respectively, through the device driver design domain 226. Any updated, added, or deleted processing device files and base projects would then be available for the validation of the system level solution created by the user 102, as described above. For example, the user 102 may have selected in the high level design a temperature sensor requiring successive approximation but the only processing device in the high level database 214 only includes delta sigma ADCs (analogue to digital converters) and therefore would not be on the list of available devices shown on the GUI of computer 104. However, upon updating the high level database 214 (and the low level database 220) to include successive approximation on that processing device or adding a new processing device that supports that feature, that updated device or the new device may now be included in the list available to the user 102.

Figure 3:
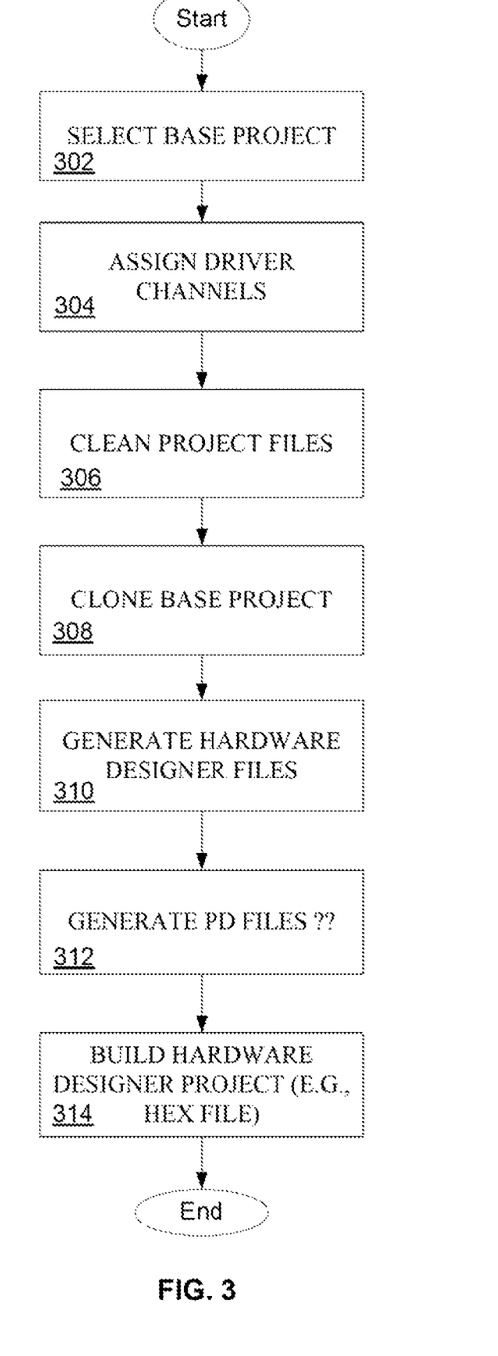
FIG. 3 is a flowchart illustrating a process for programming a processing device based on a user created system level solution, according to one embodiment of the invention.

FIG. 3 is a flowchart illustrating a process for programming a processing device based on a user created system level solution, according to one embodiment of the invention. Among various embodiments, some operations may be removed or become optional. At operation 302, a base project is selected by the PDM engine 208. As discussed above, the base project may be a static element stored in the high level database 214 and/or the low level database 220, or the base project may be dynamically created during the design process.

At operation 304, the drivers (e.g., temperature sensors, fans, LEDs) are assigned their respective channels in the project design file 210 by the PDM engine 208 according to the selected base project metadata. The PDM engine 208 selects a user module configuration, a set of user modules in a base project, and hardware and the software to configure the base project. The channel assignments bind the drivers to particular pins on the selected processing device. By virtue of the user module configuration, the drivers have access to the signals designated by the base project. The user module configuration is software that configures hardware to perform a peripheral function (e.g., a hardware counter or timer or a UART).

Optionally, at operation 306, some or all files associated with any previous build may be deleted by the PDM engine 308. This operation could be executed at any time for previous builds. In one embodiment, the files are deleted after the processing device 106 (processing device) has been programmed and the user session is closed on computer 104. However, the project design file 210 will be stored indefinitely unless manually deleted. This ensures that if base projects are changed, no conflicts would exist for any subsequent build since a new processing device file would be created, which included the new base projects, from the existing project design file 210. Additionally, this operation limits the amount of storage required to maintain the system level solution stored in the project design file 210.

At operation 308, the PDM engine 208 uses the automation interface 212 to send a command to the HD engine 218 to clone the selected base project to preserve the original base project for other future system level designs.

At operation 310, the PDM engine 208 uses the automation interface 212 to send a command to the HD engine 218 to generate the HD engine 218 source files based on the process design file 216 received from the PDM engine 208. This operation generates files consistent with the processing device configuration for the base project.

Project design source files are generated, at operation 312, by the PDM engine 208 in response to the project design file 210. The source file generation can be divided into three types: driver source files, variable transfer function source files, and system source files. For driver source files and variable transfer function source files, the source file generation follows a similar pattern. The file generation is based on instances indicated in the project design file 210. For drivers, the driver instances guide the driver source file generation. For variable transfer functions, function and variable instances guide the system transfer function source file. System source files are controlled by the files in the install path that are always generated regardless of the base project selection or project design file 210 content. Although system source files are always generated, their content is influenced by the project design file 210.

At operation 314, the HD engine 218 builds the programming image file 222 based on the embedded programmable system solution created by processing the combination of files that are created and retrieved in conjunction with the processing device file 216. The programming image file 222 represents the system level solution created by the user 102 to be programmed on the processing device 106.

Figure 4:
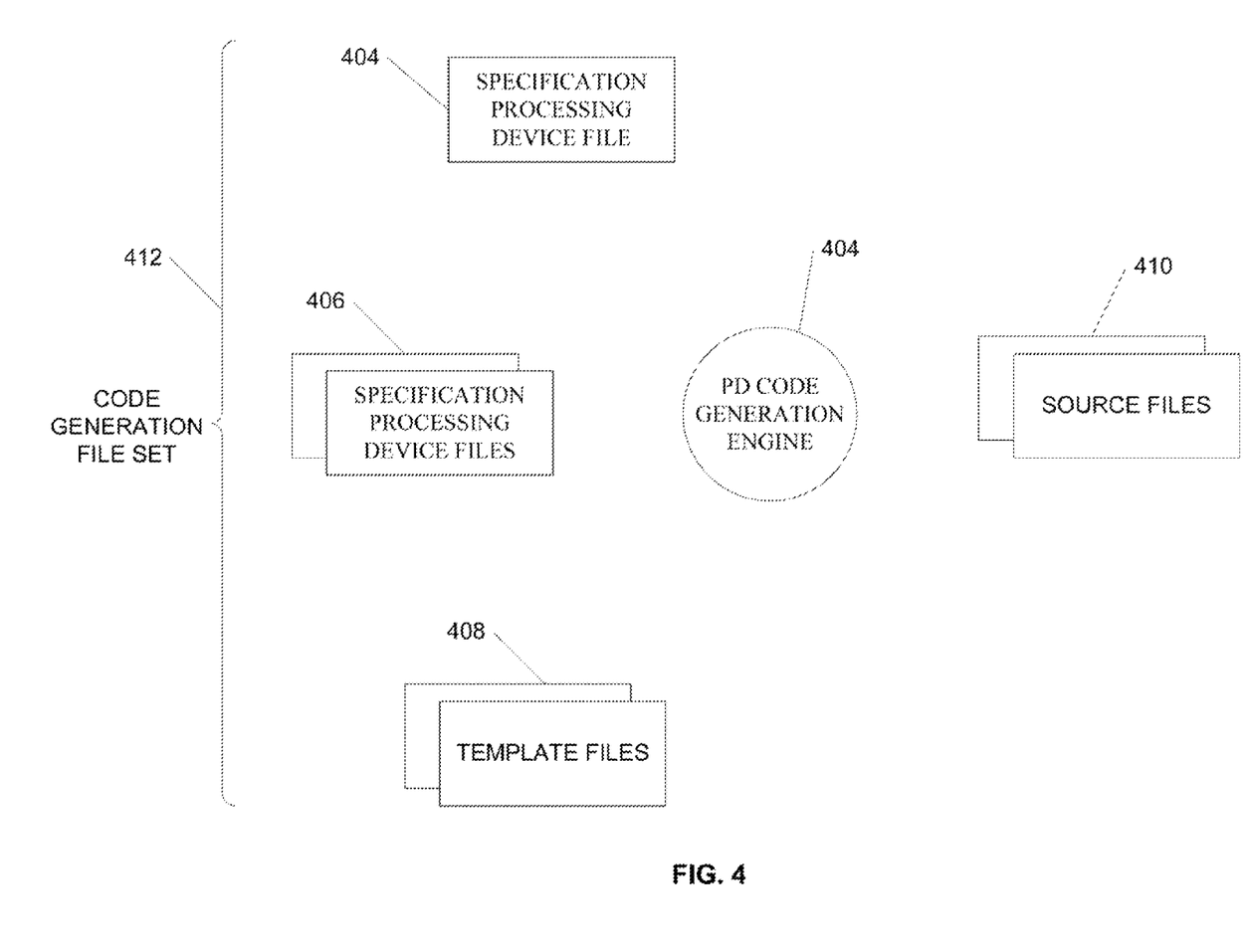
FIG. 4 illustrates file types involved in processing device code generation, according to one embodiment of the present invention.

FIG. 4 illustrates file types involved in processing device code generation, according to one embodiment of the present invention. The processing device (PD) code generation engine 402 may be part of the PDM engine 208 or may be its own module within the generic application layer 211. The file types make up a code generation file set 412, which includes a specification processing device file 404, fragment files 406, and template files 408. The specification processing device file 404 provides a file list for the PD code generation engine 402. The fragment files 406 provide a format for information as it is inserted into source files 410. The template files 408 provide the location for the fragments within each source file of the source files 410. The PD code generation engine 402 digests the project design file 210 and creates a set of keyword substitutions that replace known keywords with the data contained in the project design file 210. Special keywords are also used to collect keywords of a particular type.

In a first driver code generation operation, driver instances point to a code generation file set 412 based on the driver name. Each code generation file set 412 specifies the file list and fragments for that driver. In particular, a parameter block is defined such that a single copy of the driver functions can accommodate all instances of that driver type. The parameter block contains instance specific data as the channel assignment, driver property values, etc. The parameter blocks are collected and may be stored in ROM space so that RAM is conserved.

In a second variable transfer function code generation operation, variable transfer functions point to a code generation file set 412 based on the function selected. Each code generation file set 412 specifies the file list and fragments for that function. A parameter block is defined such that a single copy of the function source can accommodate all instances of that function. The parameter block contains instance specific data as the function input list, variant structures, and other data that vary with each instance of the function. The parameter blocks are collected and may be stored in ROM space so that RAM is conserved.

In a third system source file code generation operation, system source files (not shown) are those files that are always generated regardless of the project design file 210 content or the base project selected. They are influenced by the project design file 210 in that they include special collection keywords that gather the desired source lines in the designated location. In most cases, the collections are order independent. However, in the case of the transfer function evaluation, there are dependencies that exist between intermediate variables and output drivers that require a precise update order. In this case, the dependency order is calculated and the function calls are ordered accordingly.

In a fourth build project operation, the project is compiled and linked together to form a programming image file 222 (e.g., .hex file) used to program the processing device 106 (processing device). Due to the nature of the components combined and the processing device code generation, the firmware is error-free. Only system logic errors are relevant to the user, not microcontroller code errors. Therefore, for a valid project design file 210, all builds will be successful.

In a fifth bill of materials (BOM) and schematic creation operation, BOM and schematic data are derived from the driver channel assignments. From these assignments, pin assignments, driver schematic fragments, and BOM fragments are assembled. In one embodiment, the fragments are assembled for presentation via Web technologies into such files as HTML files. In other embodiments, the fragments may be assembled for presentation for various other platforms and applications (e.g., Adobe® .pdf, etc.)

In a sixth simulation and design verification operation, the user 102 may view and analyze the system behavior before the programming image file 222 is built. In one embodiment, the GUI displayed on computer 104 allows the user to view the system in real-time. In a first step termed simulation stimulus creation operation, simulation stimulus files are necessary to drive the inputs to the system under test. The stimulus file sets the input to the specified values at predetermined points so that the system behavior can be monitored. The stimulus file can be created in Excel™, or other spreadsheet program, and imported to the programming system 200. In a second step termed simulation code generation, the simulation code generation is analogous to code generation for the programming image file 222, except that the input and output driver functions are not needed. The driver functions are replaced by the input stimulus file for the input drivers, and by data logging for the output drivers. The remaining code generation is for the transfer functions only. The form of the code is also a scripting language, as Java™ script, instead of "C" language. The script is passed to the simulation engine where it is combined with the stimulus file for simulation execution. In a third step termed simulation execution/analysis, the simulation execution is real-time and can be logged to a file. In one embodiment of the present invention, the GUI of computer 104 shows widgets reacting to the stimulus file directly, and other widgets reacting to transfer function evaluation.

Figure 5:
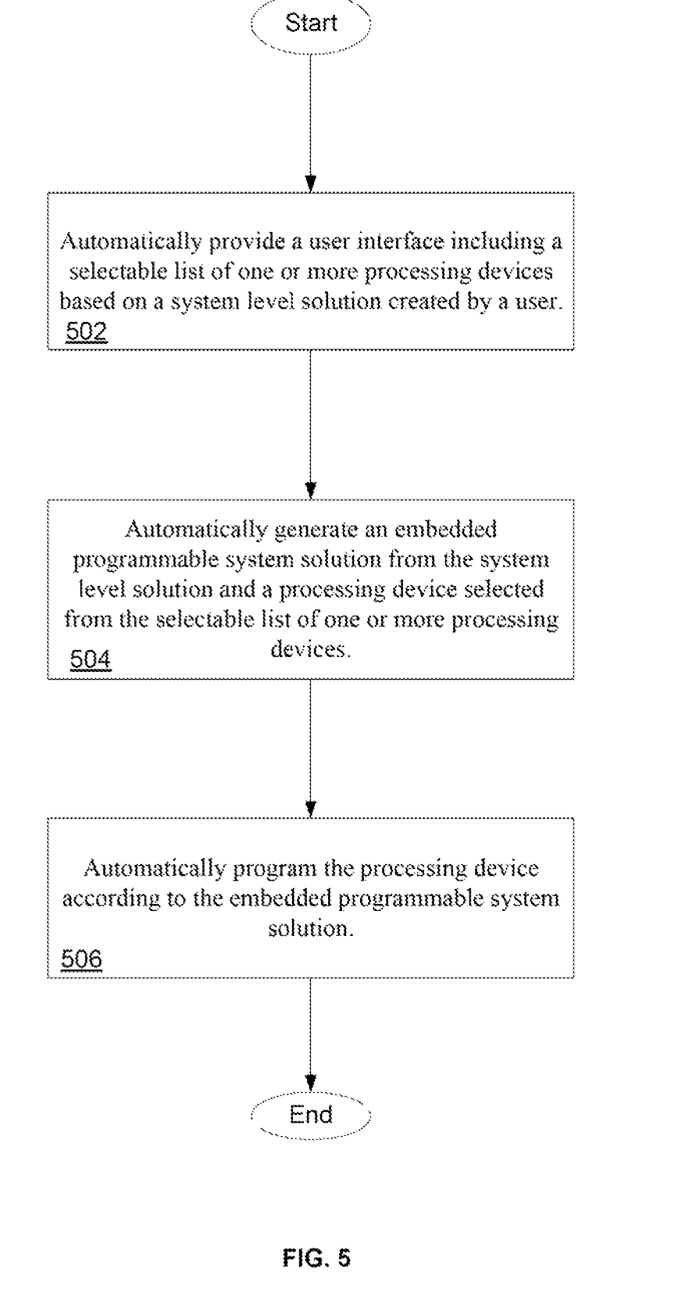
FIG. 5 is a flowchart illustrating a high level process for programming a processing device based on a user created system level solution, according to one embodiment of the invention.

FIG. 5 is a flowchart illustrating a high level process for programming processing devices based on a user created system level solution, according to one embodiment of the invention. In one embodiment of the present invention, at operation 502, the programming system 200 automatically provides a user interface including a selectable list of one or more processing devices (e.g., a processing device such as a microcontroller or a circuit including a processing device) based on a system level solution created by the user 102. At operation 504, the programming system 200 automatically generates an embedded programmable system solution from the system level solution and a processing device 106 selected by the user 102. At operation 506, the programming system 200 automatically programs the processing device 106, selected from the one or more processing devices, according to the embedded programmable system solution.

Advantages of the improved method include that no embedded code development is required by the user, as all embedded code is generated automatically. Furthermore, no programmable device-specific knowledge is required, and consistent firmware with deterministic results is created. In addition, the GUI definition method provides easier definition of system design aspects and provides easier redefinition/modification of system design aspects in light of changing requirements. The GUI definition method also provides clearer presentation of system design aspects, and design verification is raised to system-level, rather than old method, firmware, device-specific, team-member subjective verification. One advantage is that firmware results are not dependent upon individual firmware engineer's skills or subjective approaches, and are not repeatedly rewritten for new requirements.

Figure 6:
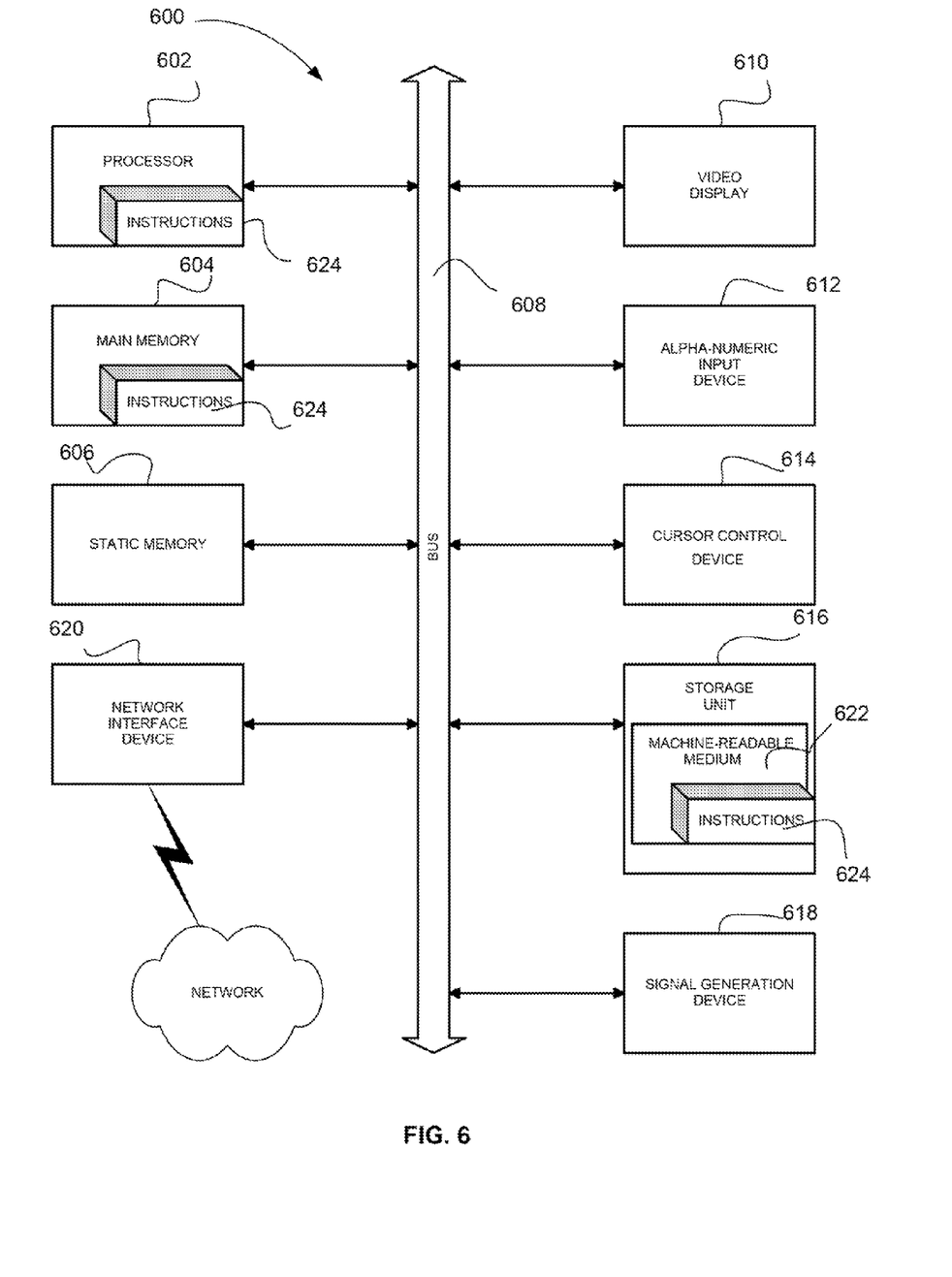
FIG. 6 illustrates a diagrammatic representation of a machine in the exemplary form of a computer system within which a set of instructions may be executed to cause the machine to perform any one or more of the methodologies discussed herein.

FIG. 6 illustrates a diagrammatic representation of machine in the exemplary form of a computer system 600 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a storage unit 616 (e.g., hard-disk drive), a signal generation device 618 (e.g., a speaker) and a network interface device 620.

The storage unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 620.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Referring to FIGS. 3 and 5, although the embodiments of the processing device programming method is shown in the form of flow charts having separate blocks and arrows, the operations described in a single block do not necessarily constitute a process or function that is dependent on or independent of the other operations described in other blocks. Furthermore, the order in which the operations are described herein is merely illustrative, and not limiting, as to the order in which such operations may occur in alternate embodiments. For example, some of the operations described may occur in series, in parallel, or in an alternating and/or iterative manner.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A system, comprising:
   at least one processor configured to:
   generate a selectable list of a plurality of processing devices based on a previously-created device-independent system-level solution;
   validate at least one of the plurality of processing devices by determining which of the plurality of processing devices can be programmed according to a current state of the device-independent system-level solution;
   generate an embedded programmable system solution from the device- independent system-level solution and a processing device selected from the selectable list of the plurality of processing devices;
   generate a programming image file based on the embedded programmable system solution;
   save a first file comprising the device-independent system-level solution; and generate a schematic of the programmed selected processing device.

2. The system of claim 1, wherein the selectable list of the plurality of processing devices comprises at least one of a programmable logic device, a field programmable gate array, a microcontroller, a microprocessor-based device, and a circuit comprising a processing device.

3. The system of claim 1, comprising:
a video display unit, wherein the video display unit is coupled to the at least one processor.

4. The system of claim 3, wherein the at least one processor is configured to generate a graphical user interface on the video display unit, wherein the selectable list of the plurality of processing devices is provided to the user through the graphical user interface.

5. The system of claim 3, wherein the at least one processor is configured to delete one or more lower level files associated with the embedded programmable system.

6. The system of claim 3, wherein the at least one processor is configured to match resource requirements of one or more functions of the device-independent system-level solution to one or more base projects associated with the plurality of processing devices to determine the selectable list of the plurality of processing devices.

7. The system of claim 6, wherein the at least one processor is configured to generate one or more base projects associated with the the plurality of processing devices based upon the resource requirements of the one or more functions of the device-independent system-level solution and physical parameters associated with the the plurality of processing devices.

8. The system of claim 3, wherein the at least one processor is configured to provide to the user a selectable list of a plurality of high level devices to design the device-independent system-level solution.

9. The system of claim 8, wherein the at least one processor is configured to update the selectable list of the plurality of high level devices and the selectable list of the the plurality of processing devices in response to a selection of high level device from the plurality of high level devices.

10. The system of claim 9, wherein the at least one processor is configured to validate a current state of the device-independent system-level solution.

11. The system of claim 10, wherein the at least one processor is configured to validate executable expressions associated with the selected high level devices.

12. The system of claim 1, wherein the schematic comprises at least one of functional pins, input output devices, and interfacing circuitry.

13. A method, comprising:
selecting a processing device from a selectable list of one or more processing devices based on a previously-created device-independent system-level solution, wherein the selectable list of one or more processing devices is generated on a video display unit;
validating a current state of the device-independent system-level solution;
validating executable expressions associated with selected high level devices;
validating the one or more processing devices by matching resources required by the current state of the device-independent system-level solution to the one or more processing devices;
automatically generating an embedded programmable system solution from the device-independent system-level solution and the selected processing device; and
automatically generating a programming image file based on the embedded programmable system solution.

14. The method of claim 13, wherein the selectable list of one or more processing devices comprises at least one of a programmable logic device, a field programmable gate array, a microcontroller, a microprocessor-based device, and a circuit comprising a processing device.

15. The method of claim 13, comprising:
automatically providing the selectable list of one or more processing devices to a user.

16. The method of claim 13, comprising:
automatically matching resource requirements of one or more functions of the device-independent system-level solution to one or more base projects associated with the one or more processing devices to determine the selectable list of one or more processing devices.

17. The method of claim 16, comprising:
automatically generating the one or more base projects associated with the one or more processing devices based upon the resource requirements of the one or more functions of the device-independent system-level solution and physical parameters associated with the one or more processing devices.

18. The method of claim 13, comprising:
automatically providing to the user a selectable list of a plurality of high level devices to design the device-independent system-level solution.

19. The method of claim 18, comprising:
updating the selectable list of the plurality of high level devices and the selectable list of the one or more processing devices in response to a selection of a high level device from the plurality of high level devices.

* * * * *